March 27, 1945. J. W. STANDISH 2,372,531
MACHINE FOR MAKING RECESSES IN STEEL TOOL SHANKS
Filed Aug. 25, 1942
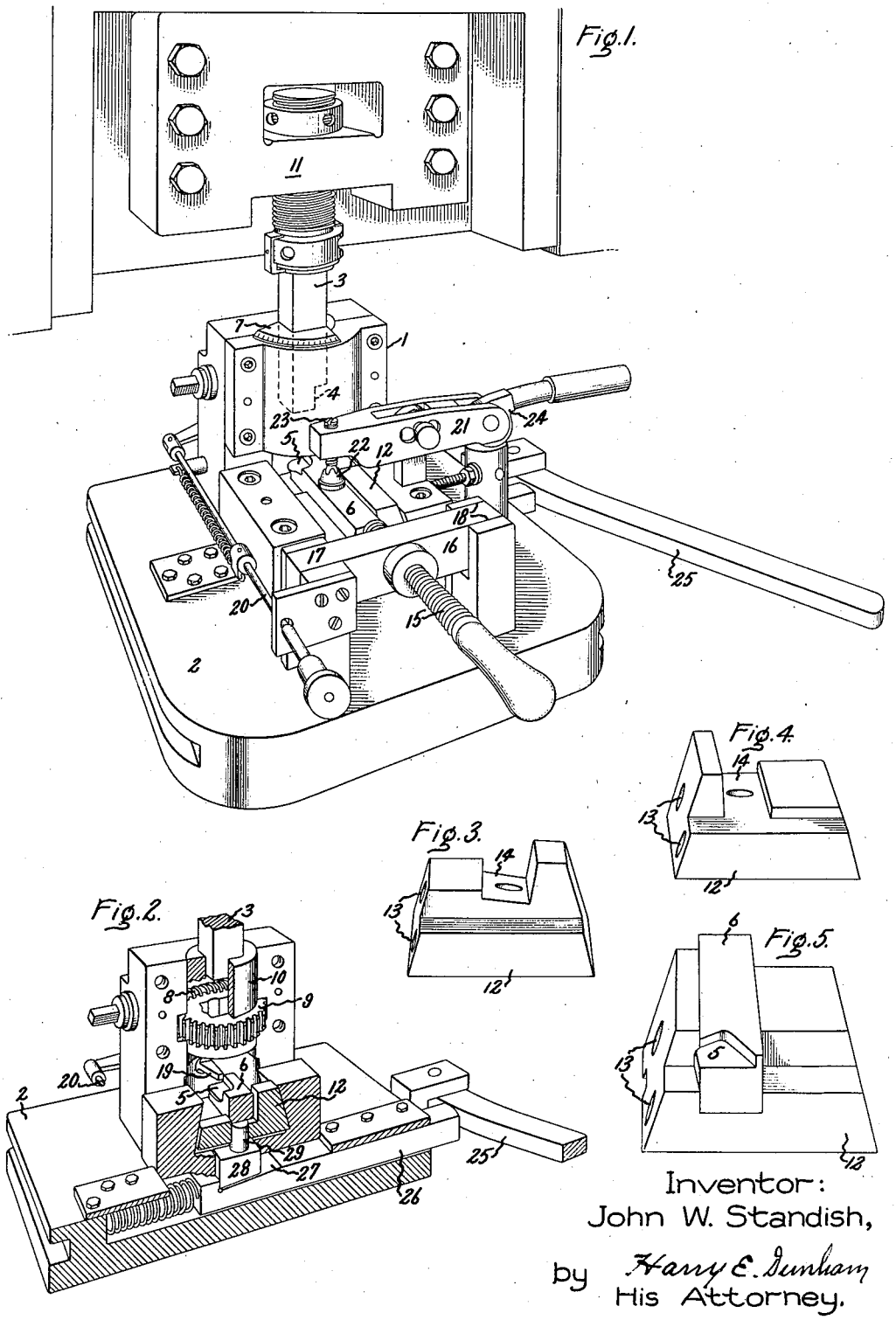
Inventor:
John W. Standish,
by Harry E. Dunham
His Attorney.

Patented Mar. 27, 1945

2,372,531

UNITED STATES PATENT OFFICE 2,372,531

MACHINE FOR MAKING RECESSES IN STEEL TOOL SHANKS

John W. Standish, Saugus, Mass., assignor to General Electric Company, a corporation of New York Application August 25, 1942, Serial No. 456,011

5 Claims. (Cl. 76—1)

The present invention is a machine for preparing steel shanks for the reception of cutting tool tips to be mounted thereon. In the manufacture of such tools it has been customary heretofore to employ highly skilled labor to mill out an end portion of each shank and thereby provide a recess into which a cutting tool tip may be positioned and thereafter copper brazed to the steel shank. Such a process obviously is time-consuming and costly.

It is an object of the present invention to simplify the process of providing recesses in steel tool shanks for the reception of tool tips. It is a further object of the invention to increase the speed of production of tipped tools. Another object of the invention is to provide means for producing recesses for tool tips in steel shanks without the use of skilled labor.

In carrying out my invention a steel shank is heated to its softening point and inserted in a special supporting block positioned in a press. The press punches the shape of the tool tip in the hot shank. Thereafter the tool tip is copper brazed to the shank in a manner well known in the art. By the use of my improved process a large number of steel shanks may be heated simultaneously and quickly punched to provide suitable recesses for the tool tips to be employed therewith thereby avoiding a long expensive milling operation on each shank.

The novel features which are charasteristic of my invention are set forth in the appended claims. My invention itself, however, will best be understood from reference to the following specification when considered in connection with the accompanying drawing in which Fig. 1 is a perspective view of the apparatus employed in carrying my invention into effect; Fig. 2 is a perspective sectional view of a portion of the machine illustrated in Fig. 1; Fig. 3 is a rear perspective view of a steel block adapted to support a relatively short steel shank in the press, while Figs. 4 and 5 are front perspective views of other types of shank supports.

Referring more particularly to the drawing, I have indicated at 1 a punch press mounted on a support 2. The press comprises a vertically reciprocating plunger or punch 3 having an end portion 4 adapted to produce a desired recess 5 in a steel shank 6. The punch 3, which is provided with a protractor 7, may be actuated to the different angular positions indicated on the protractor by means of a worm 8 and gear 9, the latter being provided with an integral cylindrical extension or collar 10 adapted to accommodate the punch 3. The upper end of the punch 3 is adjustably secured to a movable member 11 to which pressure may be applied to actuate the punch and provide the proper recess in the tool shank.

The heated tool shank is positioned in a dovetailed steel block or holder 12 adapted to slide into a cooperating dovetailed slot in the base of the punch press as shown in Fig. 2. The block 12 is held against longitudinal movement in the press by means of screws, not shown, which extend into shallow openings 13 in the sides of the blocks. Each block 12 has a cut out portion 14 which controls the sidewise position, depth, and angle of the seat in the tool shank. Various holders of different depths, widths, etc. may be provided to accommodate different tool shanks. The block 12 illustrated in Fig. 3 is adapted for use with relatively short tool shanks, the provision of a ledge on the rear of the support permitting easy positioning of the hot tool shank with a pair of tongs.

When placed in the press 1, the shank 6 may be held against backward longitudinal movement by a screw threaded bolt 15 mounted in a bar 16 pivoted at its end 17 and fitting in a recess 18 at its opposite end. The bolt 15 also may function as a quick setting gauge when the hot tools are placed in the supporting blocks 12. For this purpose a plunger 19, which may be actuated by a system of levers including the spring biased rod 20, is adapted to push the shank 6 in a longitudinal direction against the bolt 15 where it may be clamped in position. Vertical or other movement of the shank during the punching operation is prevented by a pivoted lever 21 provided at one end with a plate 22 having a universal connection with a bolt 23 adjustably mounted in one end of lever 21. The opposite end of the lever 21 is provided with a cam lever 24 whereby pressure may be applied to the plate 22. When the hot steel shank is rigidly positioned in the press, pressure is applied to the punch 3 and a recess punched in the shank by the end portion 4 of the punch.

After the recess has been produced the screw threaded member 15 is released and bar 16 rotated out of the path of the tool shank. Pressure applied to a pivoted lever 25 actuates a spring biased member 26 to a position in which an inclined plane 27 on its upper surface actuates a cooperating member 28 provided with a vertically movable pin 29 which lifts the steel shank out of the recess 14 in holder 12. The plunger 19 is then actuated by the spring biased rod 20 to contact the tool shank and eject it from the press. After the shank is removed from the press a tool tip may be positioned in the formed recess and immediately copper brazed to the shank.

The present process permits rapid formation of desired recesses in tool shanks and eliminates the use of skilled operators generally required for such work. No skill is needed to accomplish this result since angles and rakes of the various tools are developed automatically.

What I claim as new and desire to secure by Letters Patent of the United States, is:

1. A machine for punching a seat for a tool tip in a tool shank, said machine including a vertically reciprocating punch for producing the desired seat in the shank, a holder for the shank, means for locking the holder in position beneath the punch and spring biased means mounted in said machine beneath said shank and holder and adapted to move said shank in a vertical direction in said holder, and a spring biased plunger movable in a horizontal direction beneath said punch and adapted to engage one end of said shank and eject it from said machine and holder.

2. A machine for punching a seat for a tool tip in a tool shank, said machine including a vertically reciprocating punch for producing said seat, a holder for the shank, said holder being rigidly secured in said machine, and a quick-setting gage for said shank, said gage comprising a spring biased plunger contacting one end of said shank to move it in a horizontal direction in said holder and adjustable means contacting the opposite end of said shank to move it in the opposite horizontal direction.

3. A machine for punching a seat for a tool tip in a tool shank, said machine including a vertically reciprocating punch for producing said seat, a holding block for the shank, and means cooperating with one end of said shank to move it longitudinally in one direction in said block and to hold it against reverse movement therein, and means cooperating with the opposite end of said shank to eject it from said machine.

4. A machine for punching a seat for a tool tip in a tool shank, said machine including a vertically reciprocating punch for producing said seat, a holding block for the shank, locked in position in said machine beneath said punch, means cooperating with one end of said shank to move it longitudinally in one direction in said block and to hold it against reverse movement therein, spring biased means adapted to move said shank in a vertical direction and additional spring biased means adapted thereafter to move said shank in a horizontal direction and thereby eject it from said block and machine.

5. A machine for punching a recess in a tool shank, said machine including a holder for the shank, a punch for producing the desired recess in the shank, means supporting said punch for vertical reciprocation and angular adjustment, means for locking and unlocking the holder and shank in position beneath said punch, and a spring biased plunger movable in a horizontal direction beneath said punch and in alignment with said shank, said plunger being movable to adjust the position of the shank beneath said punch and to eject it from said machine when said means are unlocked.

JOHN W. STANDISH.